Sept. 4, 1945.       G. N. GOLLER       2,384,024
THERMOCOUPLE TUBE
Filed Dec. 30, 1941
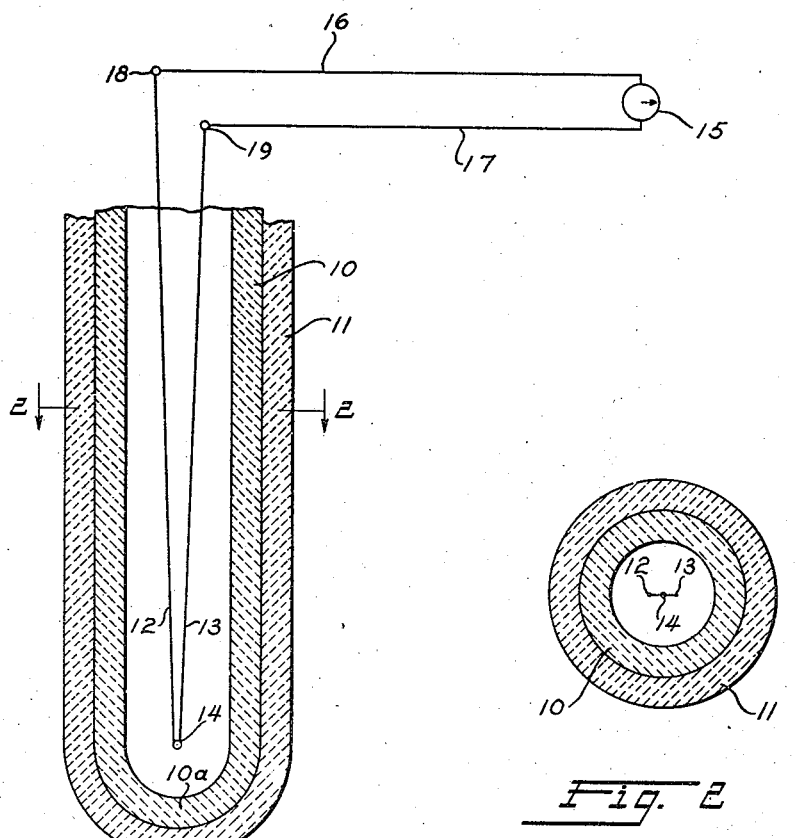
Inventor
George N. Goller Patented Sept. 4, 1945

2,384,024

UNITED STATES PATENT OFFICE 2,384,024

THERMOCOUPLE TUBE

George N. Goller, Baltimore, Md., assignor to Rustless Iron and Steel Corporation, a corporation of Delaware Application December 30, 1941, Serial No. 424,981

7 Claims. (Cl. 136—4)

This invention relates to temperature-measuring instruments, particularly to thermocouples for use in metallurgical operations.

An object of my invention is the provision of thermocouple units suitable for use in high temperature metallurgical operations, which units are light and compact and in use are capable of being handled easily by one person, which are heated in a very short time to a temperature equivalent to external temperature, and which ensure accurate and reliable temperature readings in metallurgical operations.

Another object of my invention is the provision of coated protected tubes for thermocouples employed in metal furnacing operations and the like, which tubes are economical to produce, which are capable of being immersed in molten metal without fusing, which possess the ability of withstanding the shock of sudden temperature change without checking, cracking or spalling, and which resist chemical attack from molten metal, furnace gases, slag, and the like.

Other objects in part will be obvious, and in part, pointed out hereinafter.

The invention accordingly consists in the combination of elements, features of construction and arrangement of parts as described herein, the scope of the application of which is indicated in the following claims.

In the accompanying drawing illustrating certain features of my invention,

Figure 1 is a fragmentary longitudinal sectional view of one of my thermocouple units on an enlarged scale.

Figure 2 is a transverse sectional view of the unit of Figure 1, as seen along the line 2—2.

The reference characters denote like parts throughout the views of the drawing.

As conducive to a clearer understanding of my invention, it should be noted at this point, that a heat-resistant thermocouple employed in metallurgical furnaces and the like, for measuring temperature of molten metal, is subject to attack from a variety of injurious, metal-contaminating agents. There are agents in the furnace atmosphere and in the molten metal, which, upon coming into immediate contact with the thermocouple, affect both accuracy and durability of the instrument. These agents are in such forms as contaminating metal and metal oxide vapors, carbon monoxide, slag, and the like, which attack the thermocouple generally or locally. Physical or chemical changes in the coupled metals cause the thermocouple to become irregular in sensitivity and wholly unreliable for customary high precision pyrometallurgical practice.

Certain of the thermocouples heretofore employed in measuring temperature of molten metals, are encased in heat-resistant casings or tubes. A thermocouple so encased is protected, to the extent of durability of the casing, from coming into direct contact with injurious molten metal, metal and metal oxide vapors, slag, and the like. The thermocouple, accordingly, is held free from the influence of agents usually acting to destroy its accuracy and is preserved for reliable use so long as the casing endures.

Encased thermocouple units of the prior art, however, are totally unsuitable for use in measuring temperatures of high melting point molten metals such as stainless steel. The casings either break before temperature readings are taken or later exhibit signs of failure making the accuracy of noted temperatures dubious. The casings in many instances possess insufficient resistance to heat and thus either melt or erode, upon being subject to high temperature duty. When partially immersed in molten metal, many of the casings are attacked along the slag line by slag ingredients, and fail by cracking in this area upon contracting or expanding.

Protective tubes, heretofore known in the art, are incapable of withstanding shock of sudden temperature change. They are subject to crack, check or spall, upon being immersed suddenly in molten metal. This is true, particularly where the molten metal is characterized by a high melting point, for the shock, accordingly, is increased in severity. Similar difficulty is encountered where the tubes are withdrawn suddenly from a metal bath. Shock failure, of course, ruins the tube, and of more importance, subjects the housed thermocouple to contamination and resulting inaccuracy. Such failure frequently impedes the prompt obtainment of accurate temperature readings.

Many of the heretofore known protective tubes are provided with thick insulating walls. Thick, heavy tubes are difficult to handle around the furnace and also require considerable time to heat up. Any added protection afforded to a thermocouple by a thick-walled tube, therefore, is not considered a material advantage. So much time is consumed in waiting for the tube and encased thermocouple to heat up to surrounding temperatures, that any practical advantage gained in using the unit is overshadowed. Thick tubes, moreover, break too readily when exposed to thermal shock. Heat is conducted so slowly across the thickness of the tube that resultant expansional differences cause the tube to break.

An object of my invention, therefore, is the provision of a thermocouple, including the couple itself and the protecting tube, for measuring the temperature of molten, high-melting point metal, which thermocouple is adapted to give efficient service at high temperatures, without any softening, melting, or undue eroding of its tube; which is heated or cooled readily to temperature; and which possesses high resistance to shock from sudden temperature change.

In the practice of my invention, a thermocouple (see Figs. 1 and 2) comprising, for example, a platinum element 12 and a platinum —10% rhodium element 13, hot-joined at 14, is housed within the protective tube 10. The coupled metals are connected by suitable conductors 16 and 17 across millivoltmeter 15 at terminals 18 and 19.

The thermocouple protective casing, made from vitreous silica or other like refractory material, is provided with a thin adherent coating of heat-resistant material 11 applied externally thereto. The refractory tube 10 is closed at one end as at 10a. This tube preferably ranges from 6 to 12 inches in length, has an internal diameter of about ¼ inch, and has very thin side walls approximating $\frac{1}{16}$ inch in thickness.

The adherent coating portion of my tube comprises large parts of graphite and mica and a relatively small amount of binder, such as bentonite or sodium silicate.

As illustrative of the production of thermocouple units in accordance with the provisions of my invention, I make in any well known manner, or procure, a fused vitreous silica tube of the character described. I coat the closed end and side walls of the tube with a heat-resistant, thermal shock-protective coating of graphite, mica, and clay or sodium silicate binder.

In preparing the shock-protective coating, I prefer to mix by weight about 30% to 70% graphite, and 2% to 10% binder, such as bentonite, sodium silicate or the like, with remaining material which is substantially all mica. I temper the mixture with a small amount of water. After moistening, the mixture is kneaded thoroughly to about putty consistency. The composition then is applied to the silica tube to form an external coating approximating $\frac{1}{32}$ inch to $\frac{1}{16}$ inch in thickness. I bake the tube in a kiln or the like to dry and harden the coating.

After the tube dries, the thermocouple element is inserted into the barrel of the tube. The point of juncture of the couple wires lies well within the tubes, while the element extends to a point substantially without the tube. The thermocouple and coated tube form a unit ready for accurate and efficient service in pyrometallurgical operations. In certain instances, I find it helpful to seal the open end of the tube of my thermocouple unit with suitable refractory material. This affords additional protection for the thermocouple in the coated tube.

Refractory silica tubes coated in accordance with my invention are adapted for extremely high temperature duty. They soften at temperatures ranging around 2900° F. and melt at about 3300° F. and therefore, are little affected by molten carbon steel or stainless steel. The tubes, moreover, possess unusually high resistance to thermal shock. They do not check, crack or spall even where they are immersed suddenly in a bath of high-melting point metal. Sudden temperature changes suffered by the tubes upon their withdrawal from such molten metal also is withstood effectively. They are resistant to the action of furnace gases, slag and the like, and are eroded slowly undermost severe furnace conditions.

My coated tubes, therefore, afford excellent protection for thermocouples employed in measuring temperatures of molten high melting point metals. Thermocouples encased in such tubes are accurate and reliable, for they are insulated in a thoroughly reliable manner from contaminating materials. The coating material does not crack, check or spall, but adheres firmly to the refractory base material.

The coated tubes, because of their thin wall construction, are light and are easy to handle, as compared to the relatively thick and heavy tubes of the prior art. Thermocouples protected by the tubes of my invention, are heated through the tubes to correct temperature in a very short time. Heating of the tubes, as for example, to the temperature of molten metal is accomplished in about one minute: Tubes of the prior art exposed to similar conditions require approximately five or six minutes to heat up and, therefore, make the taking of temperature readings tedious and time consuming. Moreover, the speed of the reading assures a minimum time for contamination of the thermocouple element. It is to be seen, therefore, that accurate, reliable temperature readings are procured with one of my units, without subjecting the thermocouple or the protective casing to high temperatures over a prolonged period of time.

I find that certain refractory materials other than silica, when coated in accordance with my invention, make good protective tubes for high temperature duty thermocouples. Among these other refractories are sillimanite, or mullite (aluminum silicate). Although in certain instances I prefer to use this other refractory material in lieu of silica, I find that silica tubes are very economical to produce. A silica tube, in coated condition, represents an expenditure of approximately one dollar. Sillimanite tubes coated in accordance with my invention, on the other hand, cost about three dollars.

Thus it will be seen that there has been provided in this invention, thermocouple units, and a method of producing the same, in which the various objects hereinbefore noted, together with many thoroughly practical advantages, are successfully achieved. It will be seen that these thermocouple units are especially useful in measuring the temperature of molten high-melting point metals, without becoming inaccurate through failure of their refractory casings. It will further be seen that these thermocouple units lend themselves to efficient and economical production and because of lightness of construction, are handled easily and are heated readily to correct temperature without undue exposure to destructive materials.

While as illustrative of the practice of my invention, the thermocouple of my temperature-measuring device is housed in a silica tube coated with a refractory composition, it will be understood that other refractories coated with the same or similar compositions may be employed.

Likewise, while the thermocouple of my temperature-measuring device is described as comprising coupled platinum, platinum-rhodium elements, it will be understood that iridium-rhodium, iridium-ruthenium elements, tungsten-molybdenum, or any other such elements, capable of withstanding temperatures in keeping with the abilities of the protective casing, may be employed.

As many possible embodiments may be made of my invention, and as many changes may be made in the embodiments hereinbefore set forth, it is to be understood that all matter described herein or shown in the accompanying drawing, is to be interpreted as illustrative and not as a limitation.

I claim:

1. A high-temperature duty casing for a temperature-responsive member, comprising an inner refractory casing portion comprising a substantial amount of material selected from the group consisting of vitreous silica and sillimanite, and an adherent coating consisting essentially of graphite and mica, applied externally of said inner refractory casing portion.

2. A high-temperature duty thermocouple casing having particular resistance to thermal shock, and comprising an inner refractory casing portion containing in substantial amount material selected from the group consisting of vitreous silica and sillimanite, and a coating therefor consisting essentially of graphite, mica, and bonding material selected from the group consisting of bentonite and sodium silicate, applied externally of said inner casing portion.

3. A high-temperature duty thermocouple tube having particular resistance to thermal shock, and comprising an inner refractory tubular portion made from material containing silica in substantial amount, and a coating containing 30 per cent to 70 per cent graphite, 2 per cent to 10 per cent bentonite, and the balance substantially all mica, applied externally of said inner tubular portion.

4. A high-temperature duty thermocouple casing which is sensitive yet resistant to thermal shock, said casing comprising in combination, a silica tube having a wall of about $\frac{1}{16}$ inches in thickness and an exterior adherent coating applied thereto of about $\frac{1}{32}$ to $\frac{1}{16}$ inch in thickness, said coating consisting of graphite and mica suitably bonded together.

5. A high-temperature duty casing for a temperature-responsive member, comprising a non-metallic refractory tube, and an adherent coating therefor essentially consisting of approximately 30 per cent to 70 per cent graphite, 2 per cent to 10 per cent bonding material and the balance substantially all mica.

6. A high-temperature duty thermocouple unit comprising a thermocouple, a non-metallic refractory casing therefor, and an adherent coating externally of said casing essentially consisting of graphite and mica.

7. A high-temperature duty thermocouple unit comprising a thermocouple, a vitreous silica casing therefor, and an adherent coating externally of said casing essentially consisting of approximately 30 per cent to 70 per cent graphite, 2 per cent to 10 per cent bonding material and the balance substantially all mica.

GEORGE N. GOLLER.